(12) United States Patent
Blanford (10) Patent No.: US 7,389,923 B2
(45) Date of Patent: Jun. 24, 2008

(54) METHODS AND APPARATUS FOR TRACKING THE DIRECTION OF A MOVING ITEM BY A BAR CODE SCANNER

(75) Inventor: Denis M. Blanford, Duluth, GA (US)

(73) Assignee: NCR Corporation, Dayton, OH (US)

( * ) Notice: Subject to any disclaimer, the term of this patent is extended or adjusted under 35 U.S.C. 154(b) by 189 days.

(21) Appl. No.: 11/321,165

(22) Filed: Dec. 29, 2005

(65) Prior Publication Data

US 2007/0152061 A1 Jul. 5, 2007

(51) Int. Cl.
*G06F 17/60* (2006.01)
(52) U.S. Cl. .................................. 235/385; 235/462.25
(58) Field of Classification Search ................. 235/385, 235/16, 7 R, 462.15–462.4, 470, 375, 454, 235/455; 359/442, 216
See application file for complete search history.

(56) References Cited

U.S. PATENT DOCUMENTS

| | | | | |
|---|---|---|---|---|
| 4,064,390 A | * | 12/1977 | Hildebrand et al. | 235/470 |
| 5,155,345 A | * | 10/1992 | Ito | 235/462.31 |
| 6,222,178 B1 | * | 4/2001 | Kawai et al. | 250/214.1 |
| 6,394,351 B1 | * | 5/2002 | Keys et al. | 235/462.01 |

FOREIGN PATENT DOCUMENTS

| | | |
|---|---|---|
| EP | 0392564 A2 | 10/1990 |
| EP | 0930578 A2 | 7/1999 |

* cited by examiner

*Primary Examiner*—Daniel Stcyr
(74) *Attorney, Agent, or Firm*—Priest & Goldstein PLLC (57) ABSTRACT

Methods, computer readable medium, and apparatus for tracking the direction of a moving item by laser bar code scanners are disclosed. In particular, the method includes the following steps at a first sample in time. Those steps include sensing video transitions reflected off packaging graphics of the moving item by a pair of scan planes, counting the number of video transitions sensed by each scan plane of the pair of scan planes, and determining if the moving item intersects each of the scan planes by comparing the counted number of video transitions for each scan plane of the pair with a predetermined threshold at the first sample. At a second sample in time, the above steps are repeated and the method includes the additional step of evaluating the direction of movement of the moving item from changes observed from the first sample and the second sample.

20 Claims, 8 Drawing Sheets

METHODS AND APPARATUS FOR TRACKING THE DIRECTION OF A MOVING ITEM BY A BAR CODE SCANNER

FIELD OF THE INVENTION

The present invention relates generally to improvements to tracking the direction of an item by laser bar code scanners. More particularly, the present invention relates to methods and apparatus for determining the direction of a moving item by utilizing a bar code scanner to sense the dark to light and light to dark video transitions of the item's packaging.

BACKGROUND OF THE INVENTION

Bar code scanners typically operate by using a motor and pattern mirrors to scan a light beam across a label surface and measuring the reflected light. The light beam is generated by a laser, usually a laser diode, and associated optics. The reflected light returns along the incident path and is focused onto a photodetector. The photodetector converts this collected light energy into an electrical signal. This electrical signal is processed by analog electronics, converted to a digital signal, and further processed by digital electronics, usually including a processor and associated firmware.

The processor receives a stream of bar code label data including whatever has passed within the range of the laser or light beam, including complete and partial label data. The processor, under control of programming typically stored in firmware, attempts to piece together partial bar code label data or bar code fragments ("partials") in order to decode a bar code label, ignore multiple reads of the same item, and perform other tasks. The information received can be ambiguous and otherwise difficult to interpret, for a number of reasons. For example, scanners may have difficulty reading a bar code due to its position on the item relative to the light beam. Typically, the firmware attempts to avoid a multiple read problem by requiring a relatively long delay between good reads of bar code label on identical items. This reduces scanning throughput, and is therefore presently a necessary but undesirable solution.

Another approach to eliminating duplicate scans involves utilizing item gates implemented utilizing a light emitting diode (LED) and photocell pair at the entry and exit of a scan zone. A bar code scanner utilizing this approach would detect an item entering and exiting the scan zone when the light from the entry and exit LEDs were blocked and unblocked by the item. This approach had many failings including inaccurate readings. For example, an item might not block enough of the light from the LEDs to trigger an item gate and, thus, the scan of the item would be rejected and the operator would be required to re-scan the item. Additionally, this solution requires additional hardware utilized only for the specific purpose of addressing the duplicate scan problem, thus, adding to the cost of the bar code scanner.

Another conventional approach to eliminating duplicate scans, as described in Blanford et al., U.S. Pat. No. 6,347,741, assigned to the assignee of the present invention and incorporated herein by reference in its entirety, involves utilizing motor positional information to determine the location of a bar code at any given time to determine if an item has left the scan zone. Despite its advantages, this solution requires that the bar code label be seen more or less continuously through the scan zone which does not happen on many scans due to the location or small size of bar codes currently in use.

SUMMARY OF THE INVENTION

Methods, computer readable medium, and apparatus for tracking the direction of a moving item by laser bar code scanners are disclosed. According to one aspect of the invention, the method may suitably include the following steps at a first sample in time. These steps include sensing video transitions reflected off packaging graphics of the moving item by a pair of scan planes, counting the number of video transitions sensed by each scan plane of the pair of scan planes, and determining if the moving item intersects each of the scan planes by comparing the counted number of video transitions for each scan plane of the pair with a predetermined threshold at the first sample. At a second sample in time, the above steps are repeated and the method includes the additional step of evaluating the change in how the item intersects the scan plane pair at the second instance in time in order to set a moving indicator to reflect the direction of the moving item.

Among its several advantages, the present invention samples video transitions reflected off packaging graphics of a moving item sensed at a pair of scan planes at different times, and these samples are used to determine the direction of the moving item. One application of the present invention is providing an improved solution to the problem of double scanning an item.

A more complete understanding of the present invention, as well as further features and advantages of the invention, will be apparent from the following Detailed Description and the accompanying drawings.

DETAILED DESCRIPTION

Figure 1:
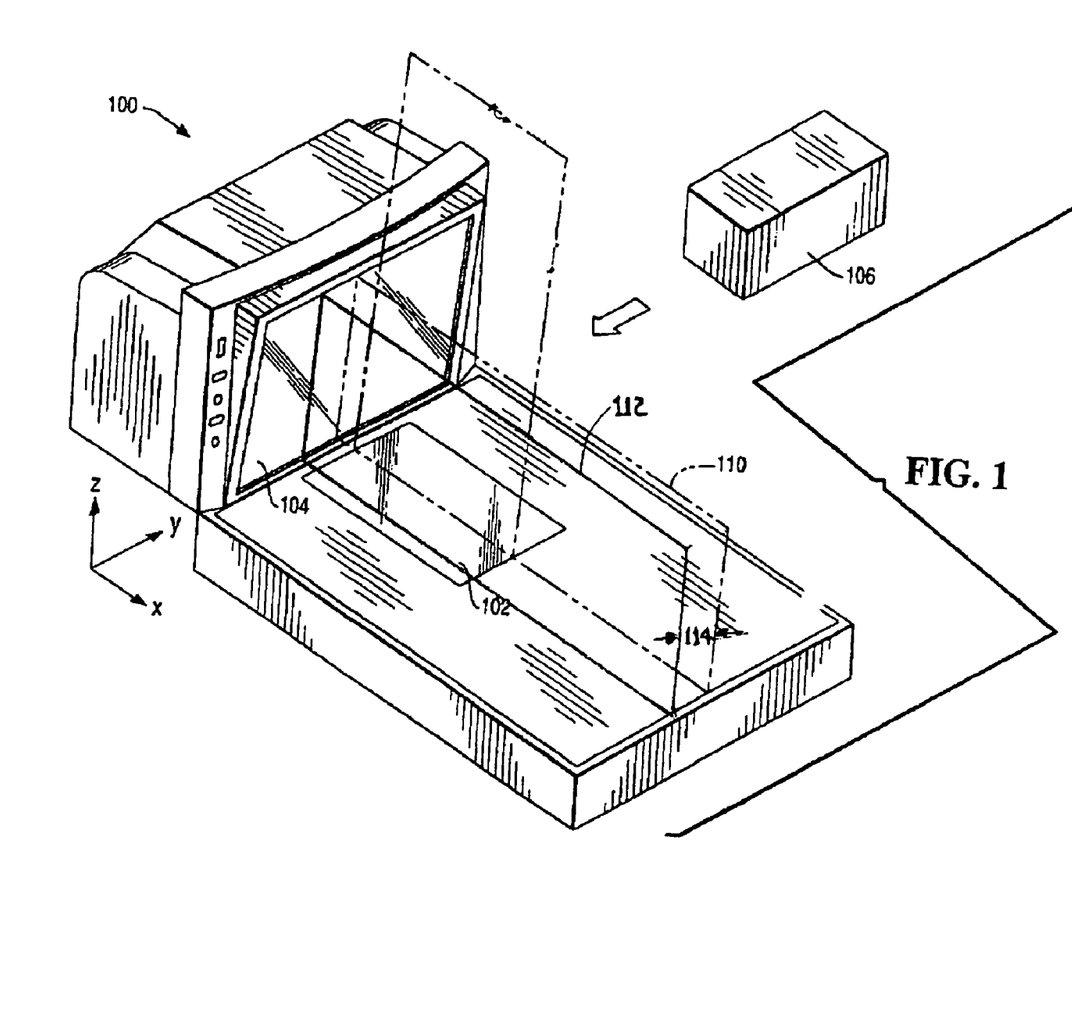
FIG. 1 illustrates an exemplary multiple window scanner capable of tracking the direction of an item in accordance with the present invention.

FIG. 1 illustrates an exemplary multiple window scanner 100 capable of tracking the direction of an item in accordance with the present invention. The scanner 100 has a horizontal scan window 102 and a vertical scan window 104. The scanner 100 generates a scanner signal based on light reflected from an object, such as object 106, passing within the field of view of one or both of the windows 102 and 104. In this illustrated example, item 106 passes through a first scan plane 110 and a parallel second scan plane 112 both emitted from the vertical scan window 104. Parallel scan planes 110 and 112 are separated by a distance, 114, of approximately one inch. The volume of space defined between parallel scan planes 110 and 112 is a scan zone. It should be noted that although only two parallel scan planes are shown for ease of illustration and purposes of discussion, many parallel scan plane pairs may be, and typically will be, emitted from both the vertical scan window 102 and the horizontal scan window 104.

Each of the scan planes 110 and 112 is produced by the tracing of a scan beam along a path determined by the rotation of a spinner 233 (FIG. 2) within the scanner 100. As the item 106 passes across scanner 100 from right to left in a normal scanning motion within the field of view of the scanner windows 102 and 104, the item 106 first intersects the scan plane 110, then, intersects both scan planes 110 and 112, then, intersects scan plane 112, and, finally, no longer intersects either scan plane 110 and 112. During the time that the item 106 is intersecting either scan plane 110, 112, or both, light is being reflected back by item 106's packaging graphics into the scanner 100. Packaging graphics are generally located on all sides of an item, and scanner 100 senses changes in reflection from the light or dark areas found on such packaging, and evaluates said changes to recognize the presence and direction of travel of the item without reading a bar code as will be described in further detail below.

Edge information relating to the number of video transitions, transitions from light to dark and dark to light, reflected by item 106's packaging graphics and into the scanner 100 can be determined in accordance with the teachings of the present invention. As will be addressed in connection with the discussion of FIG. 4, video transitions of scan plane pairs can be used to determine the direction an item is moving. As item 106 passes through scan planes 112 and 110 video transitions or activity will be seen by scanner 100 at these scan planes. As item 106 leaves the scan zone, the trailing edge of item 106 will pass beyond scan plane 110, causing a decrease in video transitions from scan plane 110 while continuing to cause video transition from scan plane 112, indicating that the item is leaving the scan zone in the right-to-left direction of FIG. 1. It should be noted that when an object 106 passes from right to left in FIG. 1, this movement will be considered generally as the forward direction by convention. Similarly, when an object 106 passes from left to right in FIG. 1, this movement will be considered as the backward direction by convention.

Additionally, if a bar code is detected on the item 106 from scan planes 110, 112, or any other scan planes, the direction of travel at the time of which the bar code is detected can also be noted. As will be addressed in connection with the discussion of FIG. 4, this information can be utilized to improve scanner accuracy and scanning throughput.

For example, a scanner, according to the teachings of the invention, can utilize an evaluation of video transitions from package graphics to determine that a first item has passed through the scan zone from the entry side, for example scan plane 110, through to the exit side, for example scan plane 112, and that the first item did not re-enter the scan zone from the exit side. If a second item enters the scan zone at the entry side, the scanner can determine that it is a new item and not the same item as the first item by discriminating between forward and backward travel. Consequently, even if the two similar items contain the same bar code label information, the scanner will determine that the second item is a new item and be able to register the second scan without the use of long timeouts to prevent double scans of the same item. Similarly if the first item reenters the scan zone from the exit plane, rescanning of its already read bar code can be prevented.

Figure 2A:
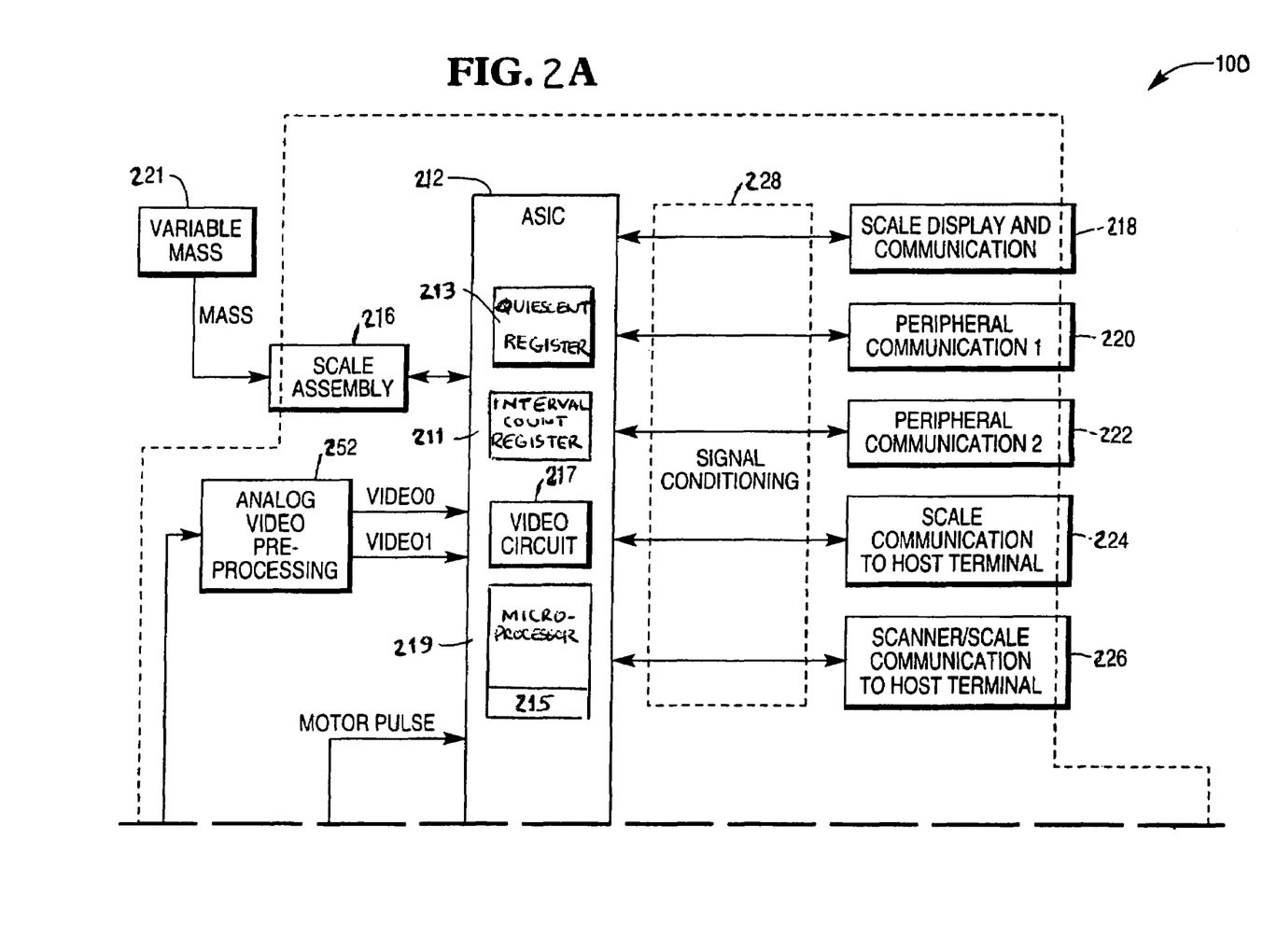
FIGS. 2A and 2B (collectively FIG. 2) illustrate details of internal components and circuitry of the scanner shown in FIG. 1.
Figure 2B:
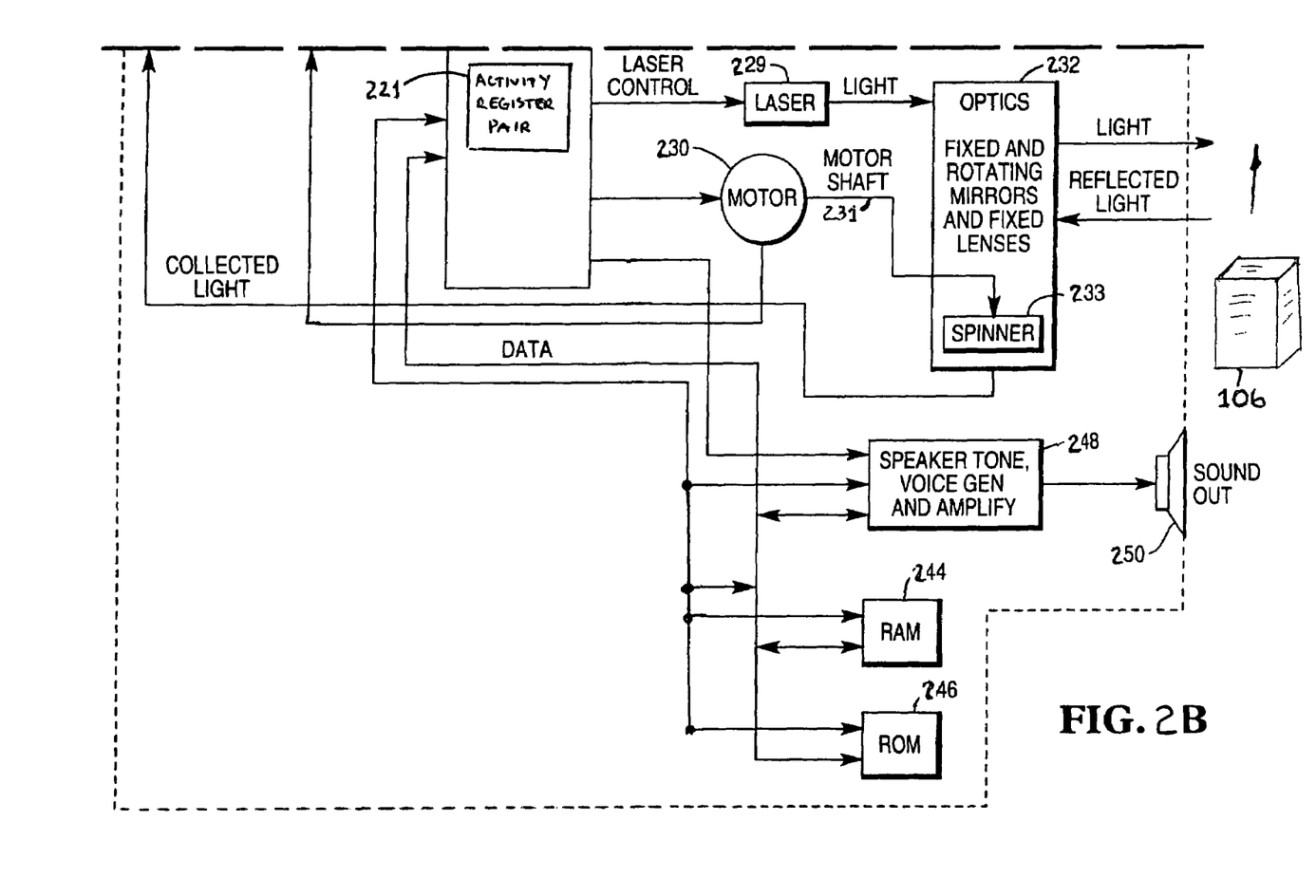

FIG. 2 (FIGS. 2A and 2B collectively) illustrates internal components and circuitry of scanner 100. The scanner 100 includes an ASIC 212. ASIC 212 includes a quiescent register 213, an interval count register 211, a video circuit 217, and a microprocessor 219 under the control of code or firmware 215 according to the teachings of the present invention. The video circuit 217 is discussed in greater detail below in connection with FIG. 3. The operation of microprocessor 219 and the code 215 according to the teachings of the present invention will be discussed in greater detail in connection with FIGS. 4 and 5.

The quiescent register 213 contains a predetermined threshold value of video transitions. A count of transitions above this predetermined threshold value indicates the presence of an object intersecting first scan plane 110. Interval count register 211 maintains a count of video transitions or intervals as described below for first scan plane 110 when an object, such as item 106, intersects first scan plane 110. Preferably, there is a register pair, referred to as an activity register pair, containing a quiescent register and a count register for each scan plane in the system. However, the teachings of the present invention also contemplate a global quiescent register shared for all scan planes. For ease of illustration, a first activity register pair 211, 213 is shown for scan plane 110 and a second activity register pair 221 is shown for scan plane 112.

The illustrated scanner 100 also includes a scale assembly 226 on which an object such as a variable mass product 221, such as a bag of produce, may be placed for weighing. Scale assembly 226 then supplies weight information to ASIC 212.

Scanner 100 may also suitably include scale display and communication circuit 218, first peripheral communication circuit 220, second peripheral communication circuit 222, scale communication to host terminal circuit 224, and scanner/scale communication to host terminal circuit 226, each of circuits 218-226 furnishing signals to ASIC 212, the signal from each of circuits 218-226 first passing through plane conditioner 228.

ASIC 212 also furnishes a laser control signal to a laser 229. It also furnishes motor control commands to a motor 230. The motor 230 includes a motor shaft 231 which is attached to an optical assembly 232. The assembly 232 may suitably include fixed mirrors or other optical components (not shown in detail), mounted so as to rotate on a spinner 233. As the motor 230 is driven in response to signals from the ASIC 212, spinner 233 is moved by motor 230. As light is emitted from laser 229, the light is reflected by assembly 232 to an optical basket which directs the light into one or more sets of parallel scanning planes so as to strike the item 106 as the item 106 crosses one or more of the scanning planes. It is presently preferred that the present invention be implemented as an upgrade to an NCR model 7875 bi-optic scanner, but it will be recognized that the present invention may be advantageously utilized as an upgrade for a wide variety of scanners for which it is desired to track the direction of an item including single scan window scanners, or as part of a newly developed scanner product.

When light strikes item 106, the light is reflected back to optical assembly 232, collected and passed to an analog video preprocessing circuit 252, which provides VIDEO0 signals to ASIC 212. Scanner 100 also preferably includes capabilities for sound generation, including sound output circuit 248 and speaker 250. Scanner 100 also includes random access memory (RAM) 244 and read only memory (ROM) 246 for storing code 215.

A data bus passes between ASIC 212, RAM memory 244, ROM memory 246 and sound output circuit 248. An address and control bus also passes between ASIC 212, RAM memory 244, and ROM memory 246.

Scanner 100 produces tones and generated voice sounds in order to communicate with an operator and to provide operator feedback. Sound output circuit 248 receives signals from ASIC 212 for instructions on what sounds to generate and when, and accesses data from RAM 244 and ROM 246 for the generation of sounds. The sounds are passed to speaker 250.

Figure 3:
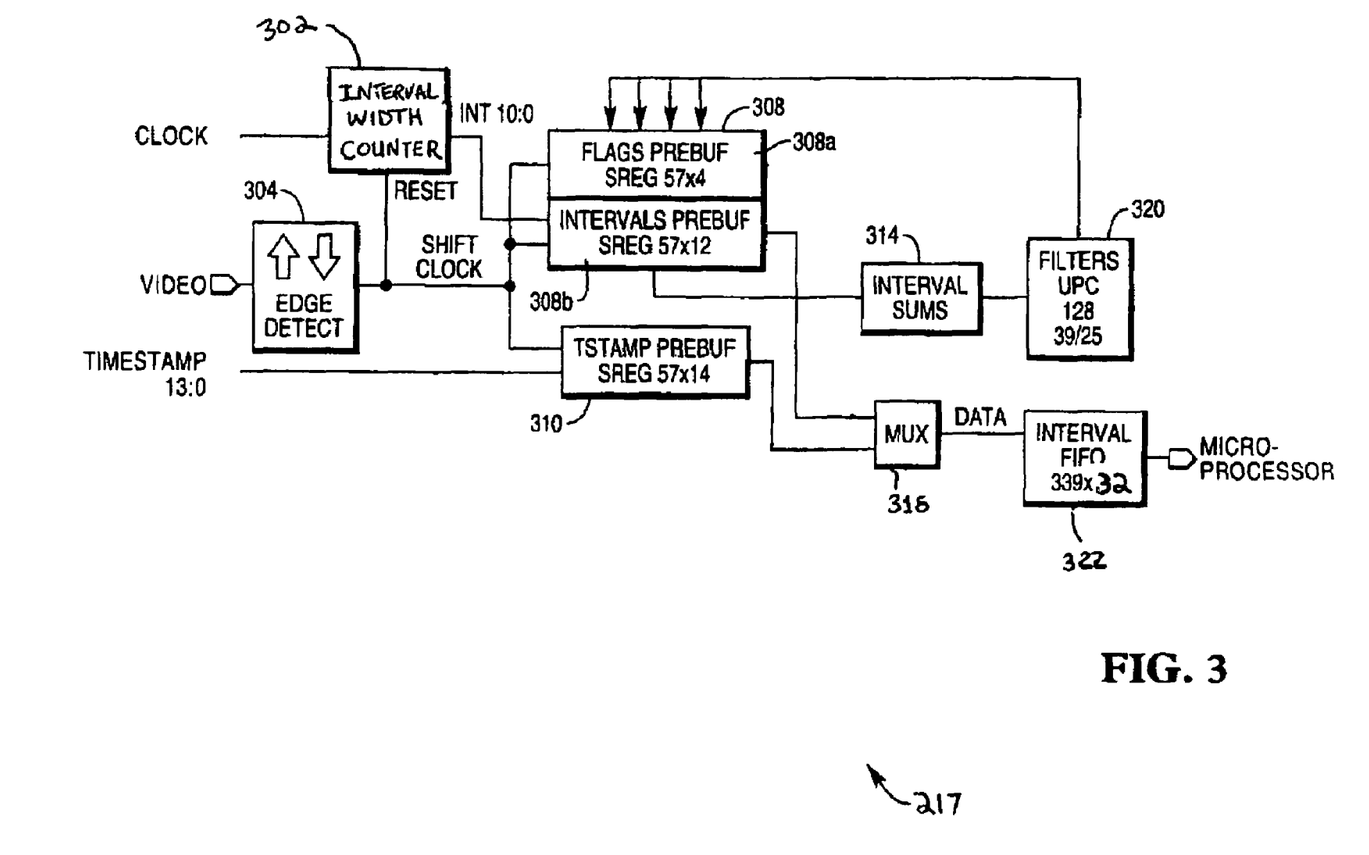
FIG. 3 shows further details of the video circuit of FIG. 2 used to collect interval data words to carry video transition information in accordance with the present invention.

FIG. 3 is a diagram illustrating further details of an implementation of the video circuit 217 of FIG. 2 which may be suitably used to count video transitions and read bar codes in accordance with the present invention. Video circuit 217 includes interval width counter 302, edge detector 304 and prebuffer 308. The prebuffer 308 includes a flags prebuffer 308a and an intervals prebuffer shift register 308b. Video circuit 217 further includes a timestamp (Tstamp) prebuffer shift register 310, interval sums 314, a multiplexer 318, UPC filter 320 and an interval first in first out (FIFO) circuit 322.

In operation, video circuit 217 receives a video input, which is routed into the edge detector 304. Edge detector 304 produces a shift clock output which is supplied to the flags prebuffer shift register 308a and the Tstamp prebuffer shift register 310. The shift clock output is also supplied to the interval width counter 302 as a reset input. Edge detector 304 causes interval width counter 302 to be started on a video transition, a 12-bit signal INT which represents value and video polarity of the interval. The signal INT is shifted into the intervals prebuffer shift register on the next transition of the video signal, which also resets interval width counter 302, thus starting the timing of the next video interval. These video intervals represent the time interval of a dark or light portion of a packaging graphic of an item, such as the item 106. These video intervals will also represent the widths of bars and spaces making up a bar code on the item 106 being scanned.

At the same time, a time stamp signal, which represents a 10-bit timestamp and four least significant bits of a motor revolution counter are shifted into the time stamp prebuffer shift register 310. Thus, the time duration of each video interval, the polarity and the time relationship to a motor position is captured for each video transition. Since each scan plane is read based on the rotation and position of motor 230, a scan plane is denoted by its associated time stamp. For example, timestamp values 1-10 may correspond to scan plane 1, timestamp values 11-20 may correspond to scan plane 2, and so on for as many scan planes as are utilized in scanner 100. A scan plane table reflecting this relationship between time stamp values and associated scan plane values preferably is stored in ROM 246. Furthermore, each interval captured by a scan plane contains an associated time stamp. By separately counting each interval having a time stamp associated with a scan plane, the number of intervals captured for a particular scan can be determined by microprocessor 219. Separately counting each interval for a particular scan plane is discussed further below in connection with FIG. 4.

The video intervals are also sent through interval sum circuit 314 and filter circuit 320, which determine if the video data stream meets predetermined timing relationships to indicate that the video data stream represents valid bar code data. For example, if the time interval between the beginning and end of the video data is too long, the data did not come from a valid scan of a bar code, and will be marked as an invalid bar code time interval. However, for video transition counting, both valid and invalid intervals are forwarded to interval FIFO 332. Similarly, if the time interval between a start and stop character of a bar code is too short, the scan will be marked as an invalid bar code time interval. The beginning and end of legitimate bar code data are marked by setting flag bits in the flags prebuffer shift register 308a to demarcate valid bar code intervals for subsequent decoding. The flag bits are then added to the corresponding interval data word stored in intervals prebuffer shift register 308b. The flags are used by the microprocessor 219 to determine which intervals are bar code intervals in order to decode a corresponding bar code. The time stamp value corresponding to a time interval is also written into interval FIFO circuit 332 with each 32 bit interval data word. Each interval data word is forwarded to microprocessor 219 for counting and, if the interval data word reflects a bar code interval, decoding as well.

Microprocessor 219, when executing code 215, processes each interval data word on an interval by interval basis. With each interval data word received, microprocessor 219 reads the time stamp carried in the interval data word, looks up an associated scan plane from the time stamp in the scan plane table stored in ROM 246, and increments an interval count register associated with the scan plane such as interval count register 211 for scan plane 110. Microprocessor 219 processes interval data words for all scan planes in one revolution of motor 230. At the end of each motor revolution, microprocessor 219, under the control of code 215, compares the value of each interval count register with its associated quiescent register to determine if activity exists on the corresponding scan plane. If the value of the interval count register is equal to or greater than the quiescent register value, activity is said to be present on the corresponding scan plane. If the quiescent register value is less than its associated interval count register value, the quiescent register value may be modified to reflect the lowest value of its associated interval count register in order to take into account different characteristics of individual scan planes such as their position and angle with respect to a scan window.

Figure 4A:
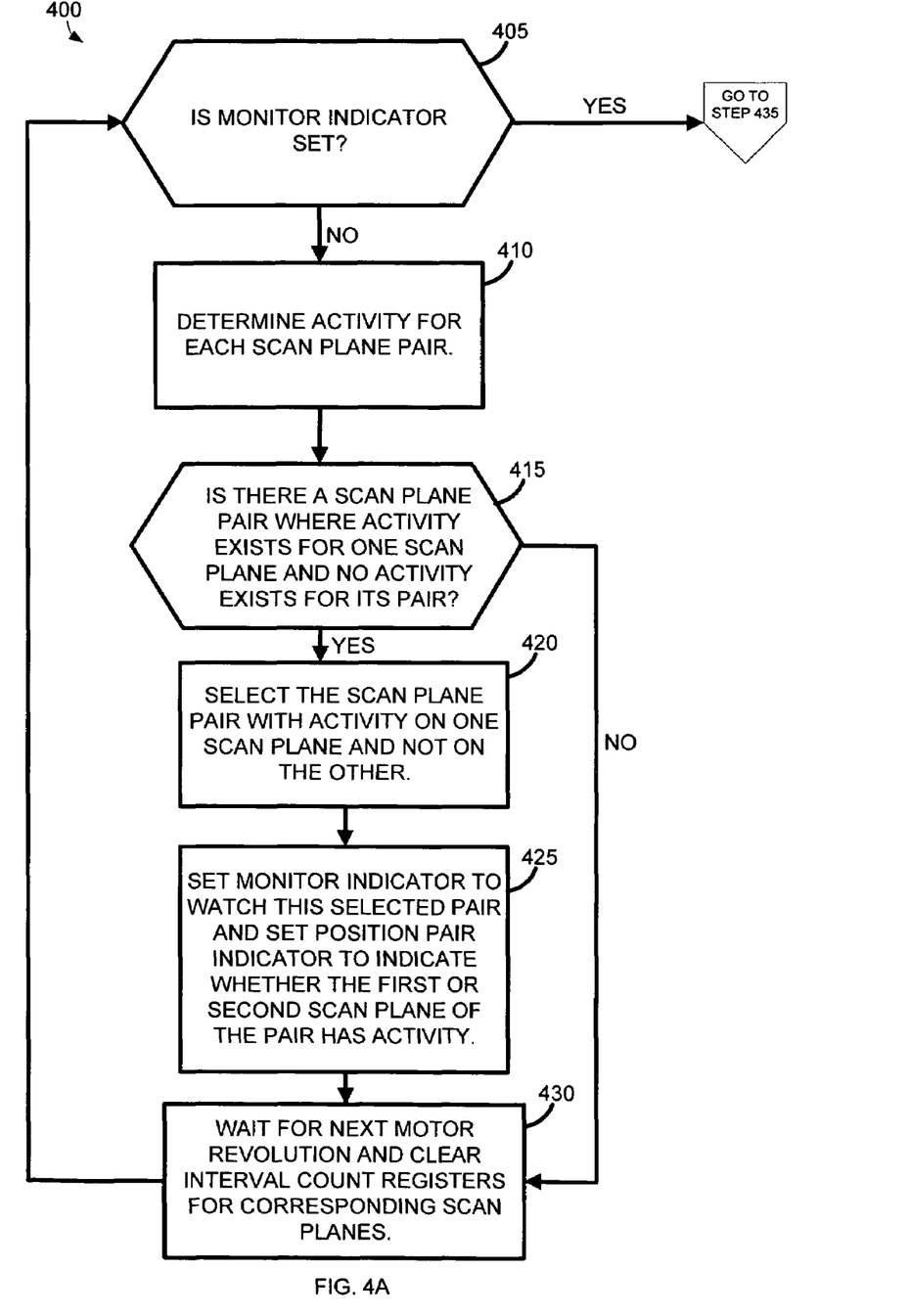
FIGS. 4A, 4B, and 4C (collectively FIG. 4) is a flowchart illustrating a method for determining the direction of travel of an object as it passes through a scan volume in accordance with the present invention.
Figure 4B:
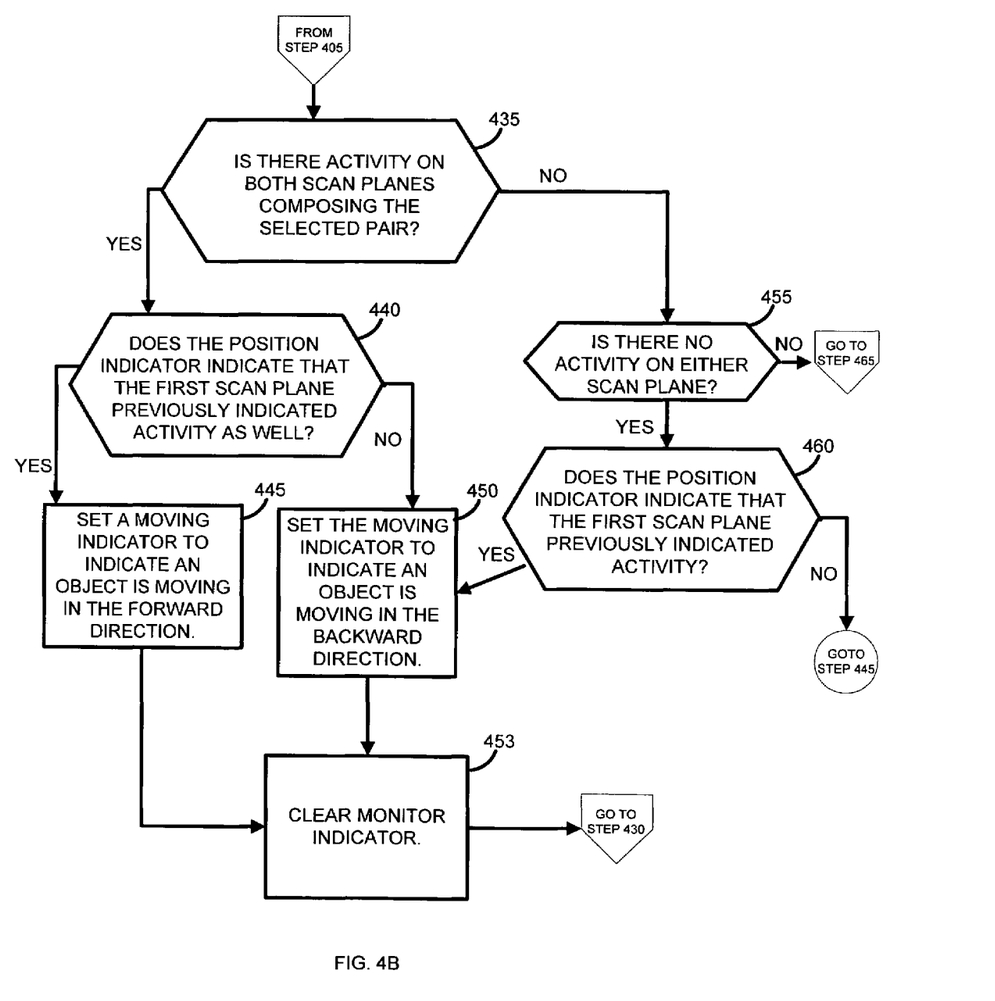
Figure 4C:
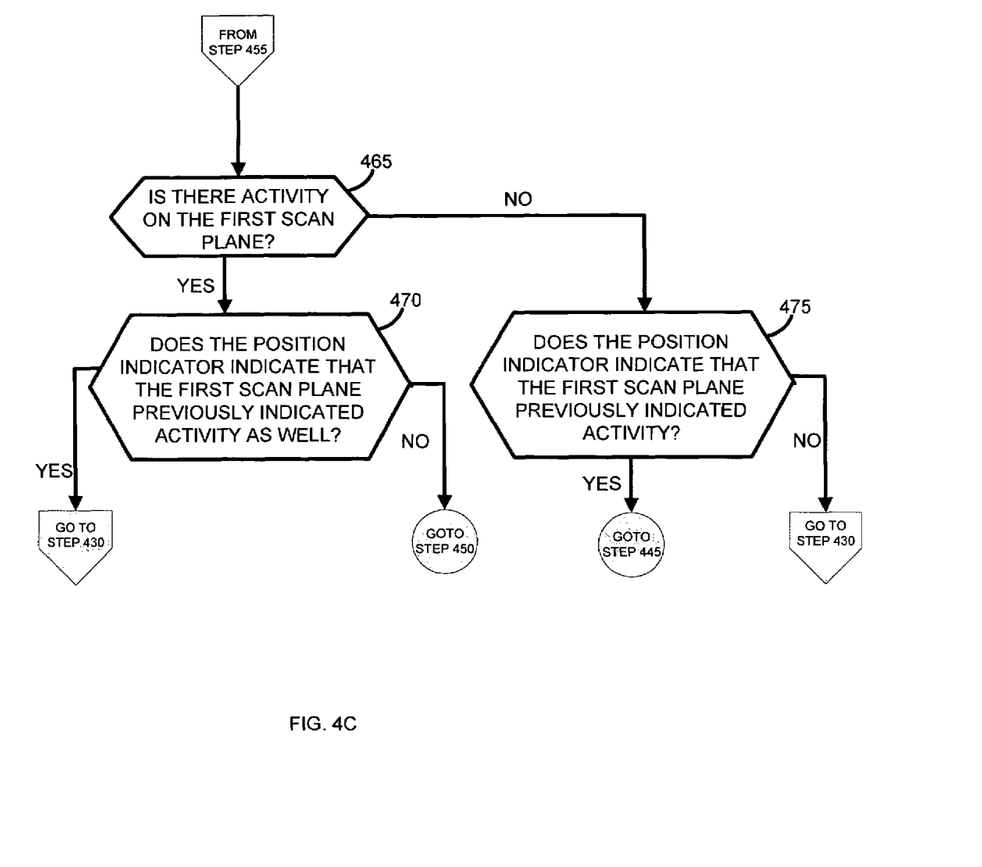

FIG. 4 (FIGS. 4A, 4B, and 4C collectively) is a flowchart illustrating a method 400 for determining the direction of movement of an object in accordance with the present invention. At step 405, the method checks whether a monitor indicator is set. This indicator is used to indicate that a pair of scan planes have sensed activity in a previous revolution of motor 230. This step 405 is used in order to make at least two samples of activity on a particular scan plane pair. A comparison of at least two samples of activity allow for the method to deduce the direction of a moving object as will be discussed below. If the monitor indicator is not set, a first sample has not yet been established. Thus, method 400 proceeds to step 410 where activity for each scan plane pair is determined. As mentioned above, activity on a particular scan plane is determined by comparing the value of its corresponding interval count register with its associated quiescent register. At step 415, it is determined whether there is a scan plane pair where activity exists for one scan plane and no activity exists for its corresponding paired scan plane. Such a scan plane pair would indicate that an object has intersected one scan plane but has not yet intersected the corresponding scan plane. If there is such a scan plane pair, the method proceeds to step 420 to select that scan plane pair to be monitored. At step 425, a monitor indicator is set to watch the activity of the selected pair in the next motor revolution.

Additionally, a position pair indicator is set to indicate whether the first or second scan plane of the select pair has activity. In the present embodiment, the first scan plane is defined as the scan plane, such as scan plane 110, which would first be intersected when the object is moving in a forward direction. At step 430, method 400 waits for the next motor revolution before transitioning back to step 405. Additionally, step 430 will clear interval count registers associated with each scan plane in order for another scan plane pair to sense the direction of the object in a subsequent motor revolution. Returning to step 415, if there is no scan plane pair where activity exists on one scan plane while no activity exists on the other, method 400 proceeds to step 430 to wait for the next motor revolution before returning to step 405. Although video transitions are collected at a first scan plane, such as scan plane 110, before a second scan plan, such as scan plane 112 due to the rotation of the motor, it will be recognized for the purposes of this invention that the first and second scan planes are sampled at the same time such as at the end of a motor revolution.

Returning to step 405, if the monitor indicator is set, method 400 has already established a pair of scan plane pairs to take a second sample of activity in order to determine direction of the object and proceeds to step 435. At step 435, it is determined if there is current activity on both scan planes composing the selected pair. If there is, method 400 proceeds to step 440 where it is determined whether the position indicator indicates that the first scan plane indicated activity in a previous motor revolution as well. If the position indicator does so indicate, method 400 proceeds to step 445. At step 445, a determination is made that the object in a previous motor revolution intersected the first scan plane and now currently intersects both the first and second scan plane. Consequently, step 445 sets a moving indicator to indicate an object is moving in the forward direction. Method 400 then proceeds to step 453 where the monitor indicator is cleared. In so doing, the direction of an object may be located by it intersecting a different set of scan plane pairs in a subsequent motor revolution. Method 400 then proceeds to step 430 to wait for the completion of the next motor revolution. At step 430, method 400 clears the interval count registers corresponding to scan planes are cleared and the method waits for the next motor revolution to complete before transitioning to step 405.

Returning to step 440, if the position indicator does not indicate that the first scan plane in a previous motor revolution had activity, the second scan plane according to step 425 in the previous motor revolution must have had activity. This result means that an object in a previous motor revolution intersected the second scan plane and now in the most recent motor revolution intersects both the first and second scan plane. At step 450, the object is moving in the backward direction. Consequently, step 450 sets the moving indicator to indicate the object is moving in the backward direction. Method 400 then proceeds to step 453 where the monitor indicator is cleared to allow another pair of scan planes to monitor the direction of the object in the next motor revolution as the object continues to move.

Returning to step 435, if there is no current activity on both scan planes composing the selected pair, method 400 proceeds to step 455. At this point in method 400, the object intersected one scan plane from the selected pair in a previous motor revolution and, during the most recent motor revolution, the object intersects with either the first scan plane, the second scan plane, or neither the first or second scan planes. Each of these three scenarios is addressed in the remaining steps. At step 455, it is determined if there is no activity on either scan plane in the select scan plane pair. Step 455 may be accomplished by comparing the corresponding interval count registers with their associated quiescent register. If there is no activity on either scan plane, method 400 proceeds to step 460. At step 460, it is determined if the position indicator indicates that the first scan plane had activity in a previous motor revolution. If it has, the object in a previous motor revolution intersected with a first scan plane and now, in the most recent motor revolution, the object does not intersect in either of the scan planes in the selected scan plane pair. In step 450, the moving indicator is set to indicate that the object is moving in the backward direction. If the position indicator does not indicate that the first scan plane had activity in a previous motor revolution, step 460, the second scan plane must have had activity in the previous motor revolution. At this point, the object, in the previous motor revolution, has intersected with the second scan plane and, now, in the most recent motor revolution, does not intersect with either the first or second scan plane. Thus, method 400 proceeds to step 445 to set the moving indicator to indicate that the object is moving in the forward direction.

Returning to step 455, if there is activity on one of the first or second scan planes, method 400 proceeds to step 465 to determine which scan plane has current activity to the exclusion of the paired scan plane. At step 465, it is determined if there is current activity on the first scan plane. If there is, method 400 proceeds to step 470. At step 470, it is determined if the position indicator indicates that the first scan plane from a previous motor revolution indicates activity. If it does, then in both a previous motor revolution and in the most current motor revolution, there has been activity on the first scan plane and no activity on the second scan plane. This scenario may result if a clerk holds the object still over a scanning window or sets it down on the scanning window. Since movement cannot be determined yet, method 400 proceeds to step 430 to wait for the next motor revolution to analyze the activity register pairs. If the position indicator does not indicate that the first scan plane had activity in a previous motor revolution, an object intersected the second scan plane in the previous motor revolution, and now currently intersects the first scan plane in the present motor revolution. Consequently, method 400 proceeds to step 450 to set the movement indicator to indicate the object is moving in the backward direction.

Returning to step 465, if there is no activity on the first scan plane and since step 455 has determined that there is activity on one of the scan planes of the selected scan plane pair, there is current activity on the second scan plane and the method 400 proceeds to step 475. At step 475, it determined if the position indicator indicates that the first scan plane had activity in a previous motor revolution. If so, the object intersected with the first scan plane in the previous motor revolution and, now, in the current motor revolution, the object intersects with the second scan plane and not the first scan plane. Thus, method 400 proceeds to step 445 to set the moving indicator to indicate that the object is moving in a forward direction. Returning to step 475, if the position indicator does not indicate that the first scan plane in a previous motor revolution had activity, there was activity on the second scan plane in the previous motor revolution and there is current activity in the present motor revolution on the second scan plane. This scenario can occur if a clerk holds an object still which intersects the second scan plane of the selected scan plane pair. Since no movement can be inferred at this point, method 400 proceeds to step 430 to await the next motor revolution to analyze the selected activity register pairs.

Figure 5:
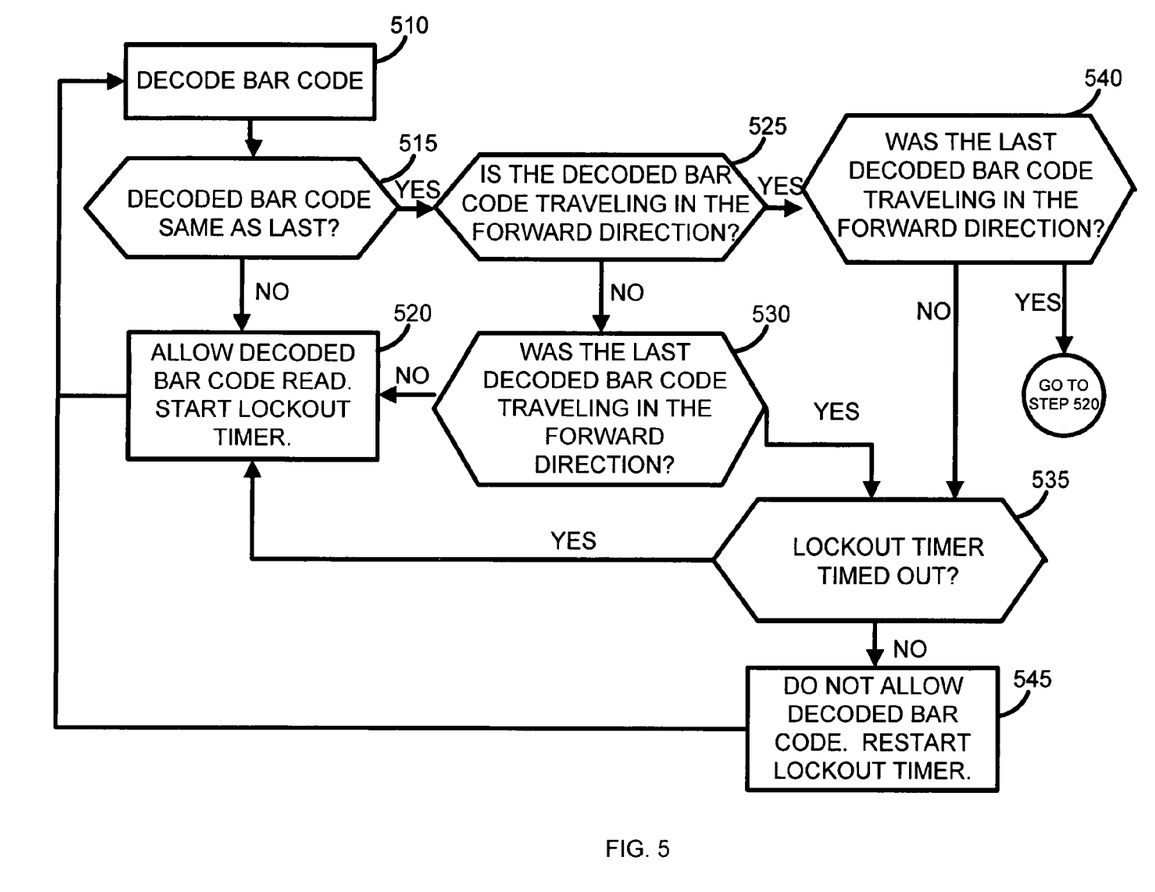
FIG. 5 is a flowchart illustrating a further method employing the results of the method of FIG. 4 to eliminate a duplicate scan in accordance with the present invention.

FIG. 5 is a flowchart illustrating a method 500 for utilizing the results of method 400 of FIG. 4 to eliminate a duplicate scan in accordance with the present invention. When processor 219 processes interval words which have been marked as valid bar code intervals as described in connection with the discussion of FIG. 3, processor 219 performs the steps of method 500 by executing the instructions in code 215. At step 510, interval words marked as valid bar code intervals are decoded and the monitor indicator of FIG. 4 is sampled and temporarily stored with the decoded bar code. At step 515, the decoded bar code is compared with the last decoded bar code. If they are different, method 500 proceeds to step 520 where the decoded bar code is allowed to proceed further in a known overall itemization process. Additionally, at step 520, a lockout timer is set. The lockout timer defines a window of time outside of which a scan of the same bar code will be allowed.

The lockout time may be viewed as a backup feature to ensure that rescanning is detected in case the scan direction cannot be determined such as the step sequence 470 to 430 and the step sequence 475 to 430. A typical value for a lockout timer is around 1.0 seconds. If the scan direction of either a first or second reading of an item with the same bar code cannot be determined, the lockout timer will reject the second reading of the item with the same bar code as long as the timer has not expired.

If, at step 515, it is determined that the decoded bar code is the same as the last decoded bar code, method 500 proceeds to step 525. At step 525, the current movement indicator is read to see whether it indicates movement in the forward direction. If it does, method 500 proceeds to step 540. At step 540, method 500 determines whether the last decoded bar code was also traveling in the forward direction. If it was, method 500 the last decoded bar code and the current decoded bar code are traveling in the same forward direction. Since a rescan typically occurs in the opposite direction of the initial scan, method 500 interprets the currently decoded bar code as an additional item and proceeds to step 520 to allow the decoded bar code to proceed further in the itemization process without waiting for a timer to expire. Consequently, scanning throughput is increased.

Returning to step 540, if the last decoded bar code was traveling in the backward direction, the direction opposite of the currently decoded bar code, method 500 proceeds to step 535. At step 535, method 500 determines whether the lockout timer has expired. If it has, method 500 proceeds to step 520 to allow the currently decoded bar code to proceed further in the itemization process. By way of example, this situation may occur if a clerk holds two of the same item, one in each hand, and scans the first item in the forward direction. The clerk then scans the second item in the backward direction. If the timer has not expired, method 500 proceeds to step 545 and precludes the decoded bar code from proceeding further in the itemization process.

Returning to step 525, if the decoded bar is traveling in the backward direction, method 400 proceeds to step 530. At step 530, method 500 it is determined if the last decoded bar code was traveling in the forward direction. If it is not, method 530 proceeds to step 520 to allow the decoded bar code to proceed further in the itemization process.

If the last decoded bar code was traveling in the forward direction, method 500 proceeds to step 535. At step 535, method 500 determines if the lockout timer has expired. If it has not, method 500 proceeds to step 520 to allow the currently decoded bar code to proceed further in the itemization process. By way of example, a clerk may have initially passed the item in the backward direction (step 525→step 530) which correctly read the bar code. The clerk, recognizing the item was scanned in the backward direction, places that item in a bag. Subsequently, the clerk scans a second and similar item in the forward direction (step 530→step 535). Since the clerk spent time putting the first item in a bag the lockout timer expires allowing scanner 100 to interpret the bar code of the second item as a second item to be itemized.

If the lockout timer has not timed out, method 500 proceeds to step 545 where the currently decoded bar code is not allowed to continue with the itemization process and the lockout timer is restarted. By way of example, this situation occurs if a clerk scans the item in the backwards direction and unknowingly attempts to re-scan the same item in the forward direction.

It should be noted that the indicators described in FIGS. 4 and 5 may be implemented as flags in RAM 244 or in separate registers in ASIC 212. Furthermore, although FIG. 5 describes an application of the present technique of tracking the direction of a moving item, the present invention contemplates other scanning applications utilizing the teachings of the present invention.

The foregoing process will be illustrated by the following examples. A clerk may hold two of the same items, one in each hand. The clerk would sequentially scan the two items in the same direction. Since the second item is proceeding in the same direction as the first item, both bar codes associated with these two items will be itemized regardless of how fast the clerk can move his or her hands in the same direction. Second, a clerk may have to scan eight individual cans of beans, for example. The clerk can use both hands and scan two cans at a time in the same direction. Since all scans were performed in the same direction, all eight cans will be properly itemized. Many other examples may be advantageously addressed by the present invention.

While the present invention has been disclosed in the context of various aspects of presently preferred embodiments, it will be recognized that the invention may be suitably applied to other environments consistent with the claims which follow.

I claim:

1. A method for determining the direction of a moving item by a bar code scanner, comprising:
    sensing video transitions occurring as a result of changes in reflection from light to dark and dark to light areas of packaging graphics of the moving item occurring in a pair of scan planes at a first sample;
    counting the number of video transitions sensed in each scan plane of the pair of scan planes at the first sample;
    determining if the moving item intersects each of the scan planes by comparing the counted number of video transitions for each scan plane of the pair with a predetermined threshold at the first sample;
    repeating the sensing, counting, and determining steps at a second sample; and evaluating the direction of movement of the moving item from changes observed from the first sample and the second sample.

2. The method of claim 1 wherein there is a predetermined threshold associated with each scan plane.

3. The method of claim 1 wherein the predetermined threshold is subsequently set to the counted number of video transitions a scan plane, if the counted number of video transitions is less than the predetermined threshold.

4. The method of claim 1 wherein the predetermined threshold and the counted number of video transitions are stored in an activity register pair.

5. The method of claim 1 wherein during the first sample the method further comprising:
    selecting the pair of scan planes from a set of scan plane pairs.

6. The method of claim 1 further comprising:
    storing the value of a moving indicator with a decoded bar code associated with the item to indicate the movement of the item when the bar code was read; and
    comparing the value of the moving indicator of the decoded bar code with the value of the moving indicator when a previously decoded bar code was decoded to preclude rescanning the same item two or more times.

7. The method of claim 1 wherein the first and second samples are first and second motor revolutions.

8. A computer readable medium whose contents cause a microprocessor of a scanner to determine the direction of a moving item, by performing the steps of:
    sensing video transitions occurring as a result of changes in reflection from light to dark and dark to light areas of packaging graphics of the moving item occurring in a pair of scan planes at a first sample;

counting the number of video transitions sensed in each scan plane of the pair of scan planes at the first sample;

determining if the moving item intersects each of the scan planes by comparing the counted number of video transitions for each scan plane of the pair with a predetermined threshold at the first sample;

repeating the sensing, counting, and determining steps at a second sample; and evaluating the direction of movement of the moving item from changes observed from the first sample and the second sample.

9. The computer readable medium of claim 8 wherein there is a predetermined threshold associated with each scan plane.

10. The computer readable medium of claim 8 wherein the predetermined threshold is subsequently set to the counted number of video transitions a scan plane, if the counted number of video transitions is less than the predetermined threshold.

11. The computer readable medium of claim 8 wherein the predetermined threshold and the counted number of video transitions are store in an activity register pair.

12. The computer readable medium of claim 8 wherein during the first sample the method further comprising:

selecting the pair of scan planes from a set of scan plane pairs.

13. The computer readable medium of claim 8 further comprising:

storing the value of the moving indicator with a decoded bar code associated with the item to indicate the movement of the item when the bar code was read; and comparing the value of the moving indicator of the decoded bar code with the value of the moving indicator when a previously decoded bar code was decoded to preclude rescanning the same item two or more times.

14. The computer readable medium of claim 8 wherein the first and second samples are first and second motor revolutions.

15. An apparatus for determining the direction of a moving item, comprising:

a scanning apparatus for sensing a number of video transitions occurring as a result of changes in reflection from light to dark and dark to light areas of packaging graphics of the moving item;

a storage device for storing a predetermined threshold of video transitions above which indicating the presence of the item intersecting a corresponding scan plane and a count of a number of video transitions sensed at each of a pair of scan planes;

a microprocessor, executing code, to count the number of video transitions sensed by each scan plane of the pair of scan planes and to store the counted number of video transitions in the storage device, the microprocessor, executing code, to compare the counted number of video transitions for each scan plane of the pair with the predetermined threshold to determine how the item intersects the pair of scan planes, and to compare the counted number of video transitions for each scan plane of the pair with the predetermined threshold at a later point in time to determine how the intersection of the item and the pair of scan planes has changed.

16. The apparatus of claim 15 further comprising:

a moving indicator, the microprocessor setting the moving indicator to reflect the direction of a moving item based on the change of how the moving item intersects the pair of scan planes.

17. The apparatus of claim 16 wherein the microprocessor stores the value of the moving indicator with a decoded bar code associated with the item to indicate the movement of the item when the bar code was read and compares the value of the moving indicator of the decoded bar code with the value of the moving indicator when a previously decoded bar code was decoded to preclude rescanning the same item two or more times.

18. The apparatus of claim 15 wherein the storage device stores a predetermined threshold associated with each scan plane.

19. The apparatus of claim 15 wherein the predetermined threshold is subsequently set to the counted number of video transitions a scan plane, if the counted number of video transitions is less than the predetermined threshold.

20. The apparatus of claim 15 wherein the microprocessor selects the pair of scan planes from a set of scan plane pairs.

* * * * *